(12) United States Patent
Avila et al.

(10) Patent No.: US 7,251,569 B2
(45) Date of Patent: Jul. 31, 2007

(54) METHOD AND APPARATUS FOR DETERMINING MATERIAL BREAKDOWN AND PRODUCT COMPLIANCE

(75) Inventors: P. German Avila, Philadelphia, PA (US); William F. Hoffman, III, Palatine, IL (US); Kurk W. Kan, Schaumburg, IL (US); Andrew M. Wertkin, Wyndmoor, PA (US)

(73) Assignee: Synapsis Enterprise LLC, Springhouse, PA (US)

( * ) Notice: Subject to any disclaimer, the term of this patent is extended or adjusted under 35 U.S.C. 154(b) by 0 days.

(21) Appl. No.: 11/043,821

(22) Filed: Jan. 26, 2005

(65) Prior Publication Data
US 2005/0197726 A1   Sep. 8, 2005

Related U.S. Application Data

(60) Provisional application No. 60/539,248, filed on Jan. 26, 2004.

(51) Int. Cl.
*A01K 5/02* (2006.01)
*G06F 19/00* (2006.01)

(52) U.S. Cl. .................................. 702/23; 705/29
(58) Field of Classification Search .................. 702/23; 700/106, 107; 705/29
See application file for complete search history.

(56) References Cited

U.S. PATENT DOCUMENTS

| | | | |
|---|---|---|---|
| 5,532,928 A * | 7/1996 | Stanczyk et al. | 705/7 |
| 5,852,560 A * | 12/1998 | Takeyama et al. | 700/97 |
| 5,878,433 A | 3/1999 | Miyamoto | |
| 6,163,732 A * | 12/2000 | Petke et al. | 700/106 |
| 6,907,351 B2 * | 6/2005 | Julia et al. | 702/23 |
| 2002/0052666 A1 * | 5/2002 | Fukatsu et al. | 700/107 |
| 2002/0099587 A1 * | 7/2002 | Kakihana et al. | 705/7 |
| 2004/0044562 A1 * | 3/2004 | Ueno et al. | 705/10 |

* cited by examiner

*Primary Examiner*—John Barlow
*Assistant Examiner*—Lisa Sievers
(74) *Attorney, Agent, or Firm*—RatnerPrestia

(57) ABSTRACT

Methods, systems, and computer program products for analyzing a product are disclosed. The product includes parts supplied by suppliers. Each part includes materials, each material includes substances, and each substance has a respective substance amount. A database includes relationship information for the product, parts, materials, substances and substance amounts. The product is analyzed by, first, receiving instructions to select at least one of the product, the parts, or the materials for analysis. Next, responsive to the received instructions, relationship information is retrieved from the database for the selected product, parts, and materials. Finally, the retrieved relationship information is processed to determine at least one of (1) a materials breakdown or (2) a compliance status for the selected product, parts, or materials.

26 Claims, 18 Drawing Sheets

| Table 1 - BOM | | | | | |
|---|---|---|---|---|---|
| Mot Item # | Quantity | Unit | Description | Supplier Part # | |
| 15R34567X21 | 2 | ea | Rigidizer | SPN1 | SPN2 |
| 01R54321T60 | 3 | ea | GPS Board | SP1G | SP2G |

FIG. 5A

| Table 2 - 15R34567X21 | SPN1 | SPN2 | VPN | Range | Material Category |
|---|---|---|---|---|---|
| mass (g) | 10 | 12 | 11 | | |
| Al 380 | 10% | 0% | 5% | 0-10 | Metal |
| Cu 390 | 20% | 20% | 20% | 20 | Metal |
| Plastic | 0% | 30% | 15% | 0-30 | Plastic |
| Epoxy | 70% | 50% | 60% | 50-70 | Epoxy |

FIG. 5B

| Table 3 - 01R54321T60 | SPN1 | SPN2 | VPN | Range | Material Category |
|---|---|---|---|---|---|
| Mass (g) | 51 | 49 | 50 | | |
| Epoxy | 60% | 55% | 58% | 55-60 | Epoxy |
| Cu 390 | 40% | 45% | 43% | 40-45 | Metal |

FIG. 5C

| Table 4 - Material Breakdown (%) | Cu | Zn | Si | Al | PC | Resin |
|---|---|---|---|---|---|---|
| Al 380 Alloy | 4% | 3% | 9% | 85% | 0% | 0% |
| Cu 390 Alloy | 81% | 2% | 17% | 0% | 0% | 0% |
| Plastic | 0% | 0% | 3% | 0% | 97% | 0% |
| Epoxy | 0% | 2% | 0% | 0% | 50% | 48% |

FIG. 5D

| Table 5 - 15R3456X21 | | | | | | |
|---|---|---|---|---|---|---|
| SPN1 V-Metal | mass in grams | | | | | |
| | Cu | Zn | Si | Al | PC | Resin |
| Al 380 | 0.035 | 0.03 | 0.085 | 0.85 | 0 | 0 |
| Cu 390 | 1.62 | 0.03 | 0.34 | 0 | 0 | 0 |
| | | | | | | |
| V-Metal SPN1 | 1.655 | 0.06 | 0.425 | 0.85 | 0 | 0 |
| | | | | | | |
| SPN2 V-Metal | mass in grams | | | | | |
| | Cu | Zn | Si | Al | PC | Resin |
| Al 380 | 0 | 0 | 0 | 0 | 0 | 0 |
| Cu 390 | 1.944 | 0.036 | 0.408 | 0 | 0 | 0 |
| | | | | | | |
| V-Metal SPN2 | 1.944 | 0.036 | 0.408 | 0 | 0 | 0 |
| | | | | | | |
| SPN1 V-Plastic | 0 | 0 | 0 | 0 | 0 | 0 |
| SPN2 V-Plastic | 0 | 0 | 0.108 | 0 | 3.492 | 0 |
| | | | | | | |
| SPN1 V-Epoxy | 0 | 0.14 | 0 | 0 | 3.5 | 3.38 |
| SPN2 V-Epoxy | 0 | 0.12 | 0 | 0 | 3 | 2.88 |

FIG. 5E

| Table 6 - 01R54321T60 | | | | | | |
|---|---|---|---|---|---|---|
| | mass in grams | | | | | |
| | Cu | Zn | Si | Al | PC | Resin |
| SP1G V-Epoxy | 0 | 0.612 | 0 | 0 | 15.3 | 14.688 |
| SP2G V-Epoxy | 0 | 0.539 | 0 | 0 | 13.475 | 12.936 |
| | | | | | | |
| SP1G V-Metal | 16.524 | 0.306 | 3.468 | 0 | 0 | 0 |
| SP2G V-Metal | 17.8605 | 0.33075 | 3.7485 | 0 | 0 | 0 |

FIG. 5F

| Table 7 - VPN 15R34567X21 | | | | | | | | | | | | |
|---|---|---|---|---|---|---|---|---|---|---|---|---|
| | Cu | | Zn | | Si | | Al | | PC | | Resin | |
| | Min. | Max. | Min. | Max. | Min. | Max. | Min. | Max. | Min. | Max. | Min. | Max. |
| V-Metal VPN | 1.655 | 1.944 | 0.036 | 0.06 | 0.408 | 0.425 | 0 | 0.85 | 0 | 0 | 0 | 0 |
| V-Plastic VPN | 0 | 0 | 0 | 0 | 0 | 0.108 | 0 | 0 | 0 | 3.492 | 0 | 0 |
| V-Epoxy VPN | 0 | 0 | 0.12 | 0.14 | 0 | 0 | 0 | 0 | 3 | 3.5 | 2.88 | 3.38 |

FIG. 5G

| Table 8 - VPN 01R54321T60 | | | | | | | | | | | | |
|---|---|---|---|---|---|---|---|---|---|---|---|---|
| | Cu | | Zn | | Si | | Al | | PC | | Resin | |
| | Min. | Max. | Min. | Max. | Min. | Max. | Max. | Min. | Max. | Min. | Max. | |
| V-Epoxy VPN | 0 | 0 | 0.539 | 0.612 | 0 | 0 | 0 | 13.475 | 15.3 | 12.936 | 14.688 | |
| V-Metal VPN | 16.524 | 17.8605 | 0.306 | 0.33075 | 3.468 | 3.7485 | 0 | 0 | 0 | 0 | 0 | |

FIG. 5H

| Table 9 | Cu | | Zn | | Si | | Al | PC | | Resin | |
|---|---|---|---|---|---|---|---|---|---|---|---|
| | Min | Max | Min | Max | Min | Max | Max | Min | Max | Min | Max |
| V-Metal BOM | | | | | | | | | | | |
| 15R34567X21 | 3.31 | 3.888 | 0.072 | 0.12 | 0.816 | 0.85 | 1.7 | 0 | 0 | 0 | 0 |
| 01R54321T60 | 49.572 | 53.5815 | 0.918 | 0.99225 | 10.404 | 11.2455 | 0 | 0 | 0 | 0 | 0 |
| V-Metal Total | 52.882 | 57.4695 | 0.99 | 1.11225 | 11.22 | 12.0955 | 1.7 | 0 | 0 | 0 | 0 |
| V-Plastic BOM | | | | | | | | | | | |
| 15R34567X21 | 0 | 0 | 0 | 0 | 0 | 0.216 | 0 | 0 | 6.984 | 0 | 0 |
| V-Plastic Total | 0 | 0 | 0 | 0 | 0 | 0.216 | 0 | 0 | 6.984 | 0 | 0 |
| V-Epoxy BOM | | | | | | | | | | | |
| 15R34567X21 | 0 | 0 | 0.24 | 0.28 | 0 | 0 | 0 | 6 | 7 | 5.76 | 6.72 |
| 01R54321T60 | 0 | 0 | 1.617 | 1.836 | 0 | 0 | 0 | 40.425 | 45.9 | 38.808 | 44.064 |
| V-Epoxy Total | 0 | 0 | 1.857 | 2.116 | 0 | 0 | 0 | 46.425 | 52.9 | 44.568 | 50.784 |

FIG. 5I

| Table 10 - Part Comp. Results | Min | Max | Average | Percentage |
|---|---|---|---|---|
| V-Metal Total | 65.09 | 72.38 | 68.73 | 40.04% |
| V-Plastic Total | 0.00 | 7.2 | 3.60 | 2.10% |
| V-Epoxy Total | 92.85 | 105.80 | 99.33 | 57.86% |
| | | | | |
| Total | 157.94 | 185.38 | 171.66 | 100.00% |
| | | Tolerance (+ or -) | 7.99% | |

FIG. 5J

| Table 11 - Virtual Technical Material Composition at BOM Level |||
|---|---|---|---|
| V-Metal Composition (%) | | | |
| | Min | Max | average |
| Cu | 73.1% | 79.4% | 76.2% |
| Zn | 1.4% | 1.5% | 1.5% |
| Si | 15.5% | 16.7% | 16.1% |
| Al | 0.0% | 2.3% | 1.2% |
| PC | 0.0% | 0.0% | 0.0% |
| Resin | 0.0% | 0.0% | 0.0% |
| Total | 89.9% | 100.0% | 95.0% |
| | | | |
| V-Plastic Composition (%) | | | |
| Cu | 0.0% | 0.0% | 0.0% |
| Zn | 0.0% | 0.0% | 0.0% |
| Si | 0.0% | 3.0% | 1.5% |
| Al | 0.0% | 0.0% | 0.0% |
| PC | 0.0% | 97.0% | 48.5% |
| Resin | 0.0% | 0.0% | 0.0% |
| Total | 0.0% | 100.0% | 50.0% |
| | | | |
| V-Epoxy Composition (%) | | | |
| Cu | 0.0% | 0.0% | 0.0% |
| Zn | 1.8% | 2.0% | 1.9% |
| Si | 0.0% | 0.0% | 0.0% |
| Al | 0.0% | 0.0% | 0.0% |
| PC | 43.9% | 50.0% | 46.9% |
| Resin | 42.1% | 48.0% | 45.1% |
| Total | 87.8% | 100.0% | 93.9% |

FIG. 5K

| Table 12 - Quality Check | | | |
|---|---|---|---|
| V-Metal Composition Max (g) | | | |
| | Calculated Max | Reported Max | % error | max limit |
| Cu | 57.47 | 54.58 | -4.21% | 58.939 |
| Zn | 1.11 | 1.06 | -0.08% | 1.141 |
| Si | 12.10 | 11.49 | -0.89% | 12.405 |
| Al | 1.70 | 1.61 | -0.12% | 1.743 |
| PC | 0.00 | 0.00 | 0.00% | 0.000 |
| Resin | 0.00 | 0.00 | 0.00% | 0.000 |
| | V-Plastic Composition Max (g) | | | |
| Cu | - | - | 0.00% | 0.000 |
| Zn | - | - | 0.00% | 0.000 |
| Si | 0.22 | 0.11 | -3.00% | 0.117 |
| Al | - | - | 0.00% | 0.000 |
| PC | 6.98 | 3.49 | -97.00% | 3.771 |
| Resin | - | - | 0.00% | 0.000 |
| | V-Epoxy Composition Max (g) | | | |
| Cu | - | - | 0.00% | 0.000 |
| Zn | 2.12 | 1.99 | -0.13% | 2.145 |
| Si | - | - | 0.00% | 0.000 |
| Al | - | - | 0.00% | 0.000 |
| PC | 52.90 | 49.66 | -3.26% | 53.631 |
| Resin | 50.78 | 47.68 | -3.13% | 51.486 |

METHOD AND APPARATUS FOR DETERMINING MATERIAL BREAKDOWN AND PRODUCT COMPLIANCE

CROSS REFERENCE TO RELATED APPLICATIONS

This application claims the benefit of the filing date of the provisional application entitled "METHOD AND APPARATUS FOR DETERMINING MATERIAL BREAKDOWN OF A PRODUCT" filed Jan. 26, 2004, which was assigned U.S. application Ser. No. 60/539,248, the contents of which are incorporated herein by reference.

FIELD OF THE INVENTION

The present invention relates to the field of environmental regulations and, more particularly, to methods and apparatus for calculating the material breakdown and compliance status of a product to facilitate compliance with extended producer responsibility environmental regulations.

BACKGROUND OF THE INVENTION

The environmental impact of electronic components is a global concern. There are presently at least three directives in force concerning the environmental impact of electronic components including the European End-of-Life Vehicle (ELV) directive, the Waste Electrical and Electronic Equipment (WEEE) directive, and the Restriction on the use of certain Hazardous Substances (ROHS) directive. In addition, a directive under consideration titled Electrical and Electronic Equipment (EEE) provides a legislative framework for environmental design standards aimed at reducing the environmental impact of electronic equipment throughout a product's life cycle. Legislation and regulatory activities have been developed in the United States and China, e.g., California's Proposition 65 and China's RoHS. Methods and apparatus do not exist for aggregating and relating environmental substances and material data for electronic components in accordance with these directives. Accordingly, there is a need for methods and apparatus for aggregating and relating environmental substance and material data for electronic components. The present invention addresses this need among others.

SUMMARY OF THE INVENTION

The present invention is embodied in methods, system, and computer program products for analyzing a product. The product includes parts supplied by suppliers. Each part includes materials, each material includes substances, and each substance has a respective substance amount. A database includes relationship information for the product, parts, materials, substances, and substance amounts. The product is analyzed by, first, receiving instructions to select at least one of the product, the parts, or the materials for analysis. Next, responsive to the received instructions, relationship information is retrieved from the database for the selected product, parts, and materials. Finally, the retrieved relationship information is processed to determine at least one of (1) a materials breakdown or (2) a compliance status for the selected product, parts, or materials.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Included in the drawings are the following figures:

FIGS. 5A, 5B, 5C, 5D, 5E, 5F, 5G, 5H, 5I, 5J, 5K, and 5L are exemplary tables in accordance with aspects of the present invention;

FIG. 7 is a screen shot of an exemplary screen for presenting a bill of materials (BOM) status report in accordance with an aspect of the preset invention;

FIG. 9 is a screen shot of an exemplary screen presenting an exemplary worst case analysis report in accordance with an aspect of the present invention;

FIG. 13 is a screen shot of an exemplary screen for displaying an audit trail for the compliance history of each requested supplier part report in accordance with an aspect of the present invention.

DETAILED DESCRIPTION OF THE INVENTION

Figure 1:
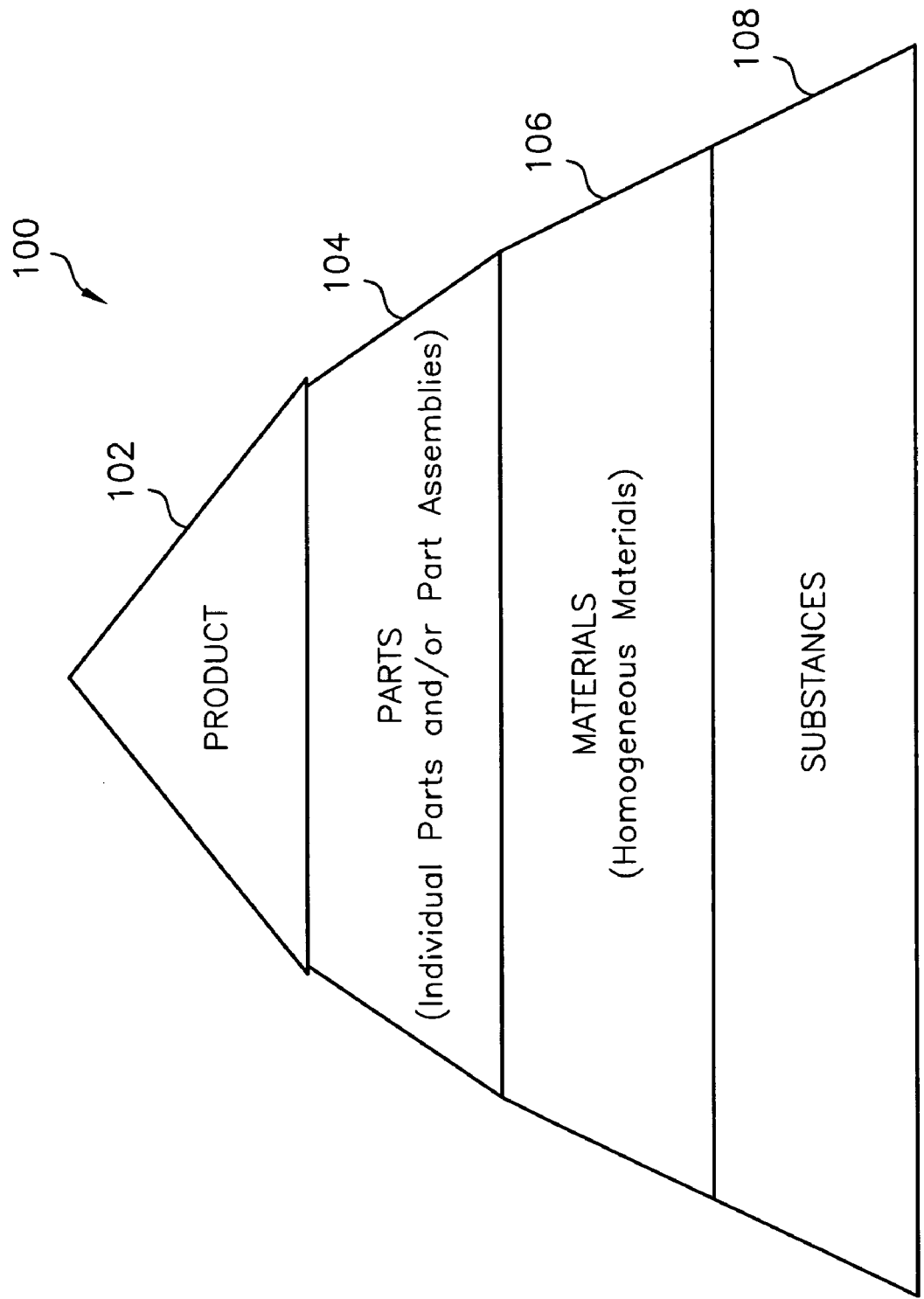
FIG. 1 is an illustration for setting forth terminology useful in describing aspects of the present invention.

FIG. 1 is a general illustration 100 setting forth terminology used herein for describing the present invention. A product 102 is a commodity that may be offered for sale, e.g., a cellular telephone, radio, tire, or automobile. Each product 102 includes one or more parts 104, e.g., circuit board(s), electronic component(s), or radio. A part may be a single part or a part assembly made up of two or more sub-parts. For example, a printed circuit board part may be considered a part assembly that is made up of other sub-parts such as a bare circuit board having conductive traces and one or more discrete components and/or integrated circuits that are mounted on the bare circuit board. In addition, a product 102 may be a part 104 within another product. For example, a cellular telephone may be a part within an automobile. The term part may be used herein to refer to a part, part assembly, and/or a sub-part of a part assembly.

Parts 104 are made up of materials 106. In an exemplary embodiment, materials 106 are homogeneous materials in accordance with an environmental or company directive, e.g., the ROHS directive or other such directive. Such homogeneous materials are materials of uniform composition throughout that can not be mechanically disjointed into different materials. Exemplary homogeneous materials include certain types of plastics, ceramics, glass, metals, alloys (e.g., aluminum and copper alloys), paper, board, resins, coatings, etc. The term "mechanically disjointed" means that the materials can be, in principle, separated by mechanical actions such as unscrewing, cutting, crushing, grinding, and abrasive processes.

A plastic cover may be a homogeneous material if it consists of one type of plastic that is not coated with, or does not have attached to it or inside it, any other kinds of materials. An electric cable that consists of metal wires surrounded by non-metallic insulation materials is an example of a non-homogeneous material, because the different materials could be separated by mechanical processes. In this case, a maximum limit value specified in a directive, for example, may apply to each of the separate materials individually. A semi-conductor package may contain many homogeneous materials such as plastic molding materials, tin electroplating coatings on the lead frame, the frame alloy, and gold bonding wires.

Materials 106 are made up of substances 108. Substances 108 represent the makeup of the product at a base level and may be defined by an applicable directive. In an exemplary embodiment, substances 108 are periodic elements. For example, aluminum alloy and copper alloy materials 106 may be made of substances 108 such as Aluminum (Al) and copper (Cu), respectively, among others. Substances 108 may also include non-periodic elements such as resin, aluminum oxide, and polycarbonate.

There may be multiple suppliers in a supply chain supplying each of parts 104. Each part 104 from a different supplier may include different materials 106, substances 108, and/or concentrations of substances 108. For descriptive purposes, a part within a product may be referred to as a company part and the parts supplied by the individual suppliers for use as the company part may be referred to as a supplier part. Accordingly, each company part may be associated with one or more supplier parts.

In accordance with the present invention, relationship information may be stored with the product, parts, and/or materials, e.g., within a database on a storage device, to enable aggregation (roll-up) of substance for products, parts, and/or materials. Relationship information defines the relationship of a product with its parts, the parts with their suppliers and their materials, the materials with their substances, and substances with their substance amount. For example, relationship information may identify parts and/or part assemblies within the product, parts within part assemblies, the materials within each part, the suppliers of the parts and part assemblies, the substances within each material, and the respective substance amount associated with each substance (i.e., substance amounts).

Figure 2:
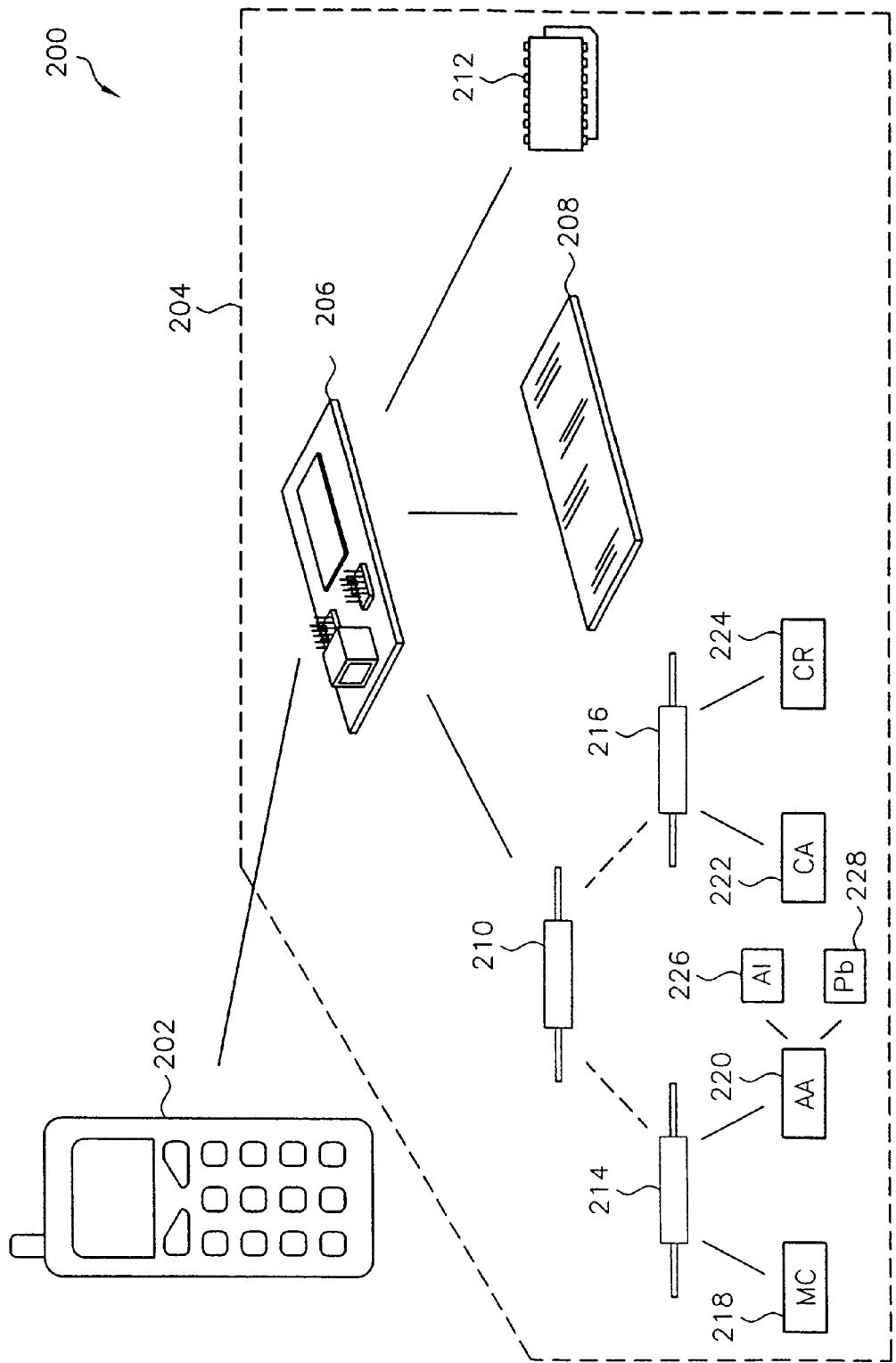
FIG. 2 is an illustration of a cellular telephone and components of the cellular telephone for further setting forth terminology useful in describing aspects of the present invention.

FIG. 2 is an illustration 200 of a cellular telephone 202 and components 204 thereof for further setting forth the terminology used herein. Components 204 include an assembled circuit board 206, a bare printed circuit board 208, a resistor 210, and an integrated circuit 212. Assembled circuit board 206 is a part assembly including printed circuit board 208, resistor 210, and integrated circuit 212.

With reference to FIGS. 1 and 2, cellular telephone 202 is a product 102. Cellular telephone is made up of parts 104, which, in the illustrated embodiment, include an assembled circuit board 206, a printed circuit board 208, a resistor 210, and an integrated circuit 212. Assembled circuit board 206 may be referred to as a part 104 or as a part assembly that is made up of other parts, i.e., printed circuit board 208, resistor 210, and integrated circuit 212. Parts 204 are made up of materials 106 and each part may be supplied by one or more suppliers.

In the illustrated embodiment, resistor 210 used in product 202 may be a resistor 214 supplied by a supplier or another resistor 216 supplied by the same or a different supplier. The composition of first and second resistors 214 and 216 may be different. For example, resistor 214 may be made up of materials 106 such as mold compounds (MC) 218 and Aluminum alloy (AA) 220. Resistor 216, on the other hand, may be made up of materials 106 such as Copper alloy (CA) 222 and ceramic (CR) 224. Furthermore, Aluminum alloy 220 may be made up of substances 108 such as Aluminum (Al) 226 and Lead (Pb) 228.

If an automobile is identified as product 102, cellular telephone 202 may be analyzed as a part 104 (e.g., part assembly) within the automobile. Cellular telephone 202 may then include a printed circuit board part assembly that, in turn, includes parts such as a bare printed circuit board, resistor, and integrated circuit.

Figure 3:
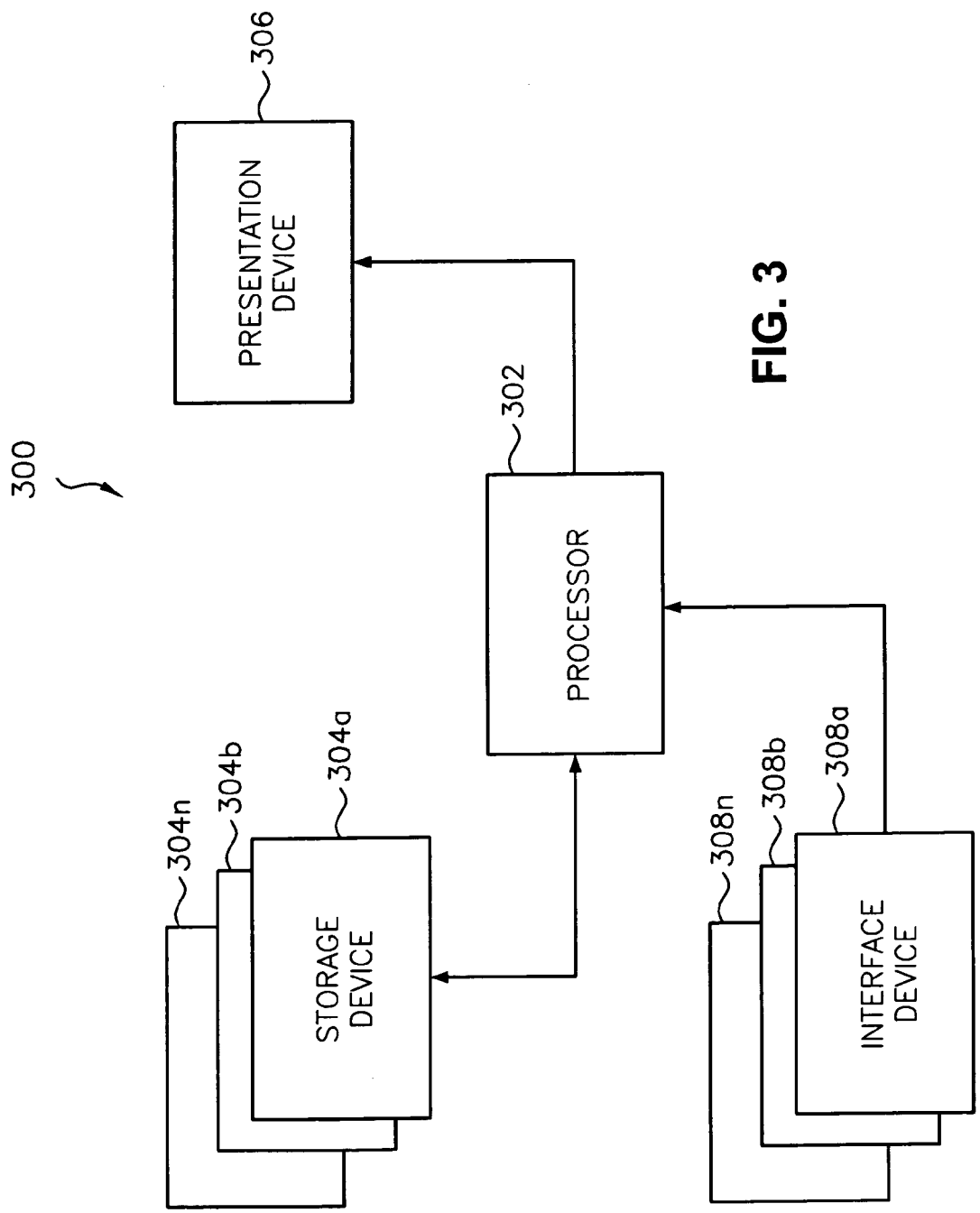
FIG. 3 is a block diagram of an apparatus for determining material breakdown of a product in accordance with an aspect of the present invention.

FIG. 3 depicts an exemplary apparatus 300 in accordance with the present invention. A processor 302 is coupled to a presentation device 306, one or more storage devices 304a-n, and one or more interface devices 308a-n. Storage device(s) 304 include, by way of non-limiting example, memory, databases, servers, cache, and material content repositories such as the International Materials Data System (IMDS, which is available via the Internet at www.mdsystem.com). Storage device(s) 304 contains information such as the data described below with reference to FIGS. 5A-D and one or more programs including instructions for performing material breakdown, regulatory compliance, and/or related calculations in accordance with various aspects of the present invention. Presentation device 306 includes, by way of non-limiting example, a monitor and a printer. Interface device(s) 308 includes, by way of non-limiting example, a conventional user input device such as a computer mouse or keyboard, a network interface device, and an Internet interface device such as a World Wide Web (WWW) browser (referred to herein as a web browser). Suitable processors, storage devices, presentation devices, and interface devices for use with the present invention will be understood by those of skill in the art from the description herein.

In a general overview, processor 302 receives, from a user via an interface device(s) 308 or a program residing on a storage device(s) 304, instructions requesting information such as a breakdown of base materials (i.e., a materials breakdown) for a product or compliance with regulatory standards. The materials breakdown may be for the product, the parts or part assemblies within the product, and/or the materials within the parts. Processor 302 retrieves information from storage device(s) 304 as needed to carry out the received instructions. Also, processor 302 stores, in storage device(s) 304, the materials breakdown, compliance status, and/or additional data as needed to determine the materials breakdown and compliance status, such as the data described below with reference to FIGS. 5E-H. Processor 302 is coupled to presentation device 306 to present the materials breakdown, regulatory compliance, and/or related calculations, e.g., to a user, environmental agency, customer, etc.

Figure 4:
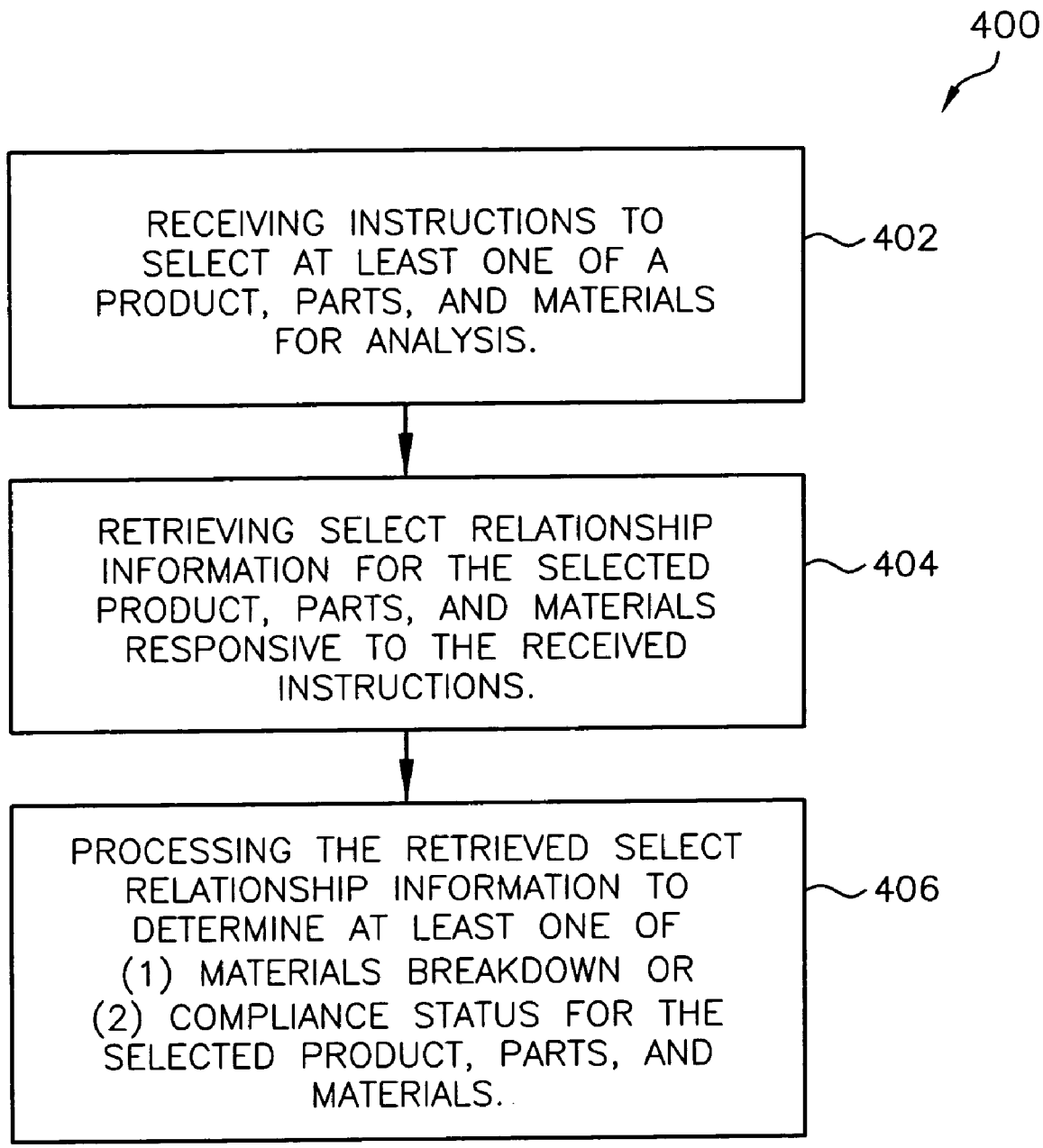
FIG. 4 is a flow chart of exemplary steps for determining a material breakdown or a compliance status in accordance with an aspect of the present invention.

FIG. 4 depicts a flow chart 400 of exemplary steps for determining a materials breakdown and/or compliance status of a product, parts, and materials in accordance with an aspect of the present invention. As set forth above, a product includes one or more parts, each part may be supplied by one or more suppliers, and each part includes one or more materials. In addition, each material includes one or more substances having a respective substance amount. Further, relationship information for the product, parts, materials, substances, and substance amounts corresponding to the respective substances may be stored in one or more databases. The steps set forth in FIG. 4 are described with reference to FIG. 3.

Processing begins at block 402 with the receipt of instructions to select at least one of a product, one or more parts, and one or more materials for analysis. In an exemplary embodiment, instructions are received at processor 302 via an interface device 308. The product, parts, and/or materials may be presented via presentation device 306 and instructions may be received from a user through a selection of one or more of the presented product, parts, and materials using a conventional selection device such as a computer mouse. The selection may be for any combination of products, parts, and/or materials. For example, the product may be selected along with a subset of the one or more parts. Suitable methods and apparatus for receiving selection instructions will be understood by those of skill in the art from the description herein.

At block 404, select relationship information for the selected product, parts, and materials are retrieved in response to the selection at block 402. In an exemplary embodiment, processor 302 processes the received instructions and queries storage device 304 to retrieve the select relationship information. The select relationship information may include all available relationship information for the product, parts, materials, substances, and substance amounts, or a subset of the available relationship information, e.g., only relationship information associated with the selected product, parts, and materials.

Finally, at block 406, the retrieved relationship information is processed to determine a materials breakdown and/or a compliance status for the selected product, parts, and materials. In an exemplary embodiment, processor 302 processes the retrieved relationship information (which includes respective substance amounts for substances associated with the selected product, parts, and materials) to determine a materials breakdown and/or compliance status for the selected product, parts, and materials. Processor 302 may present the determined materials breakdown and/or compliance status via presentation device 306. Additional details regarding the processing of the retrieved relationship information and substance amounts will be described in further detail below.

Figure 5:
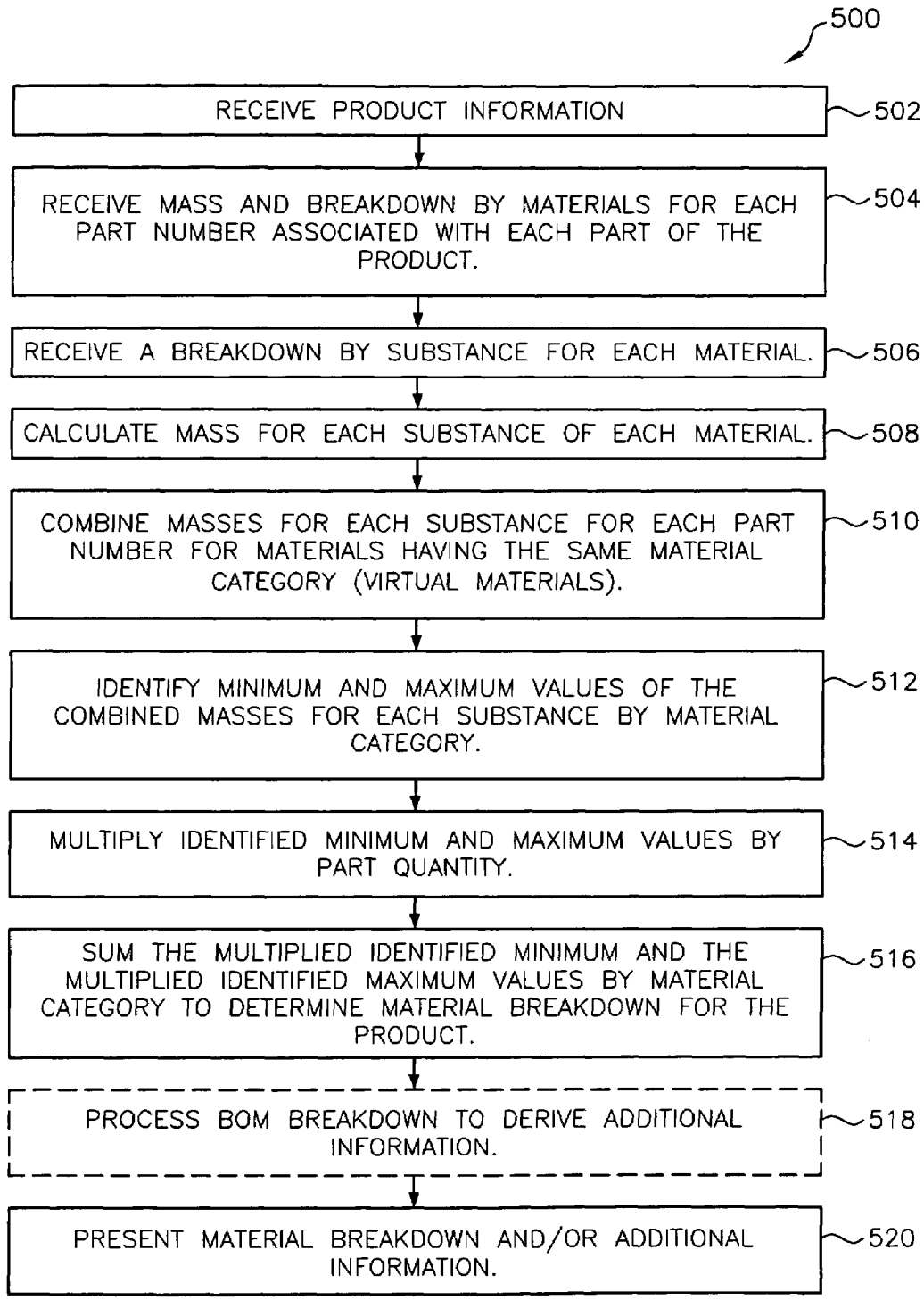
FIG. 5 is a flow chart of exemplary steps for processing relationship information and substance amounts to determine and present a material breakdown of a product in accordance with an aspect of the present invention.

FIG. 5 depicts a flow chart 500 of exemplary steps for determining a materials breakdown for parts with multiple suppliers. The steps described with reference to FIG. 5 are for individual parts. The aggregation of determined materials breakdown for multiple parts within a part assembly or parts and part assemblies within a product to determine materials breakdown for a respective part assembly or product will be understood by those of skill in the art from the description herein. The steps are described with reference to Tables 1-12 (FIGS. 5A-5L), which are described throughout the exemplary steps.

Tables 1-12 collectively refer to two company parts, i.e., company part number 15R34567X21 (referred to herein as 'X21) and company part number 01R54321T60 (referred to herein as 'T60). There are two parts supplied for each company part number, i.e., supplier part numbers SP1 and SP2 for 'X21 and supplier part numbers SP1G and SP2G for 'T60. Although two supplier parts are illustrated for each company part, it will be understood that essentially any number of supplier parts may exist for each individual company part.

Processing begins at block 502 with the receipt of part information. In an exemplary embodiment, the part information is retrieved from a bill of materials (BOM) for a product that includes the part. The BOM includes a company part (item) number, part quantity, and supplier part number for each company part on the BOM. Each supplier part includes at least one material and each material includes at least one substance. The BOM information may be received in a flat file or in a conventional spreadsheet or database compatible with, for example, Excel or Access computer applications available from Microsoft Corporation of Redmond, Wash., USA. In the illustrated embodiment, all supplier parts identified in the bill of materials are on the same level, i.e., no part assemblies that include multiple parts, however, those of skill in the art will understand how to aggregate information for parts within part assemblies from the description herein.

FIG. 5A depicts an exemplary table of BOM information (Table 1), including a company part (item) number in the far left column, part quantity in the second column from the left, and supplier part numbers in the two columns on the far right. Each illustrated company part has two supplier parts, i.e., SPN1 and SPN2 for 'X21 and SP1G and SP2G for 'T60. Each supplier part that corresponds to a company part may be supplied by a different supplier and may have different compositions of materials and/or substances.

Processing continues at block 504 where a mass (e.g., in grams) and a breakdown of materials is received for each supplier part associated with each company part. FIG. 5B depicts an exemplary table for the 'X21 company part (Table 2) that shows the mass and breakdown by material for each supplier part (second column from the left for supplier part SPN1 and third column from the left for supplier part SPN2). For example, exemplary supplier part SPN1 is 10 grams and contains 10% Al 380, 20% Cu 390, and 70% Epoxy (by weight). Table 2 further depicts information for a virtual part (VPN) in the fourth column from the left. In an exemplary embodiment, the information for the VPN is determined by averaging the information across all supplier parts for a particular company part. For example, the mass of supplier parts SPN1 and SPN2 are added and the result is divided by two to obtain the mass of the VPN. Additionally, Table 2 depicts a material category, e.g., metal, plastic, and epoxy, that is associated with each material. FIG. 5C depicts a table of information for supplier part 'T60 (Table 3) similar to that shown in Table 2.

At block 506, a breakdown of each material by substance is received. FIG. 5D depicts an exemplary table depicting the breakdown of each material (Table 4). For example, the material Al 380 contains, by weight, 4% copper (Cu), 3% Zinc (Zn), 9% Silicon (Si), and 85% Aluminum (Al) and the material epoxy includes 2% Zn, 50% polycarbonate (PC) and 48% Resin. The breakdown of each material by substance is relationship information that may be obtained from an external source such as from the IMDS database via the Internet.

Processing proceeds at block 508 with a calculation of mass for each substance of each material for each supplier part responsive to the received mass, breakdown by materials, and breakdown by substances. FIG. 5E is an exemplary table depicting calculated masses by substance for each material for each supplier part corresponding to company part 'X21 (Table 5). For example, the amount of substance Cu in material Cu 390 for supplier part SPN1 is 1.62 grams. This value is obtained by determining the mass of Cu 390 for service part SPN1 from Table 2 (i.e., 10 grams*20%=2 grams) and then determining the mass of Cu within Cu 390 for service part SPN1 (i.e., 2 grams*81%=1.62).

At block 510, the masses of each base material for each supplier part for materials associated with the same material category are combined. For example, Al 380 and Cu 390 are both associated with the metal material category. The combination of materials within a given material category is referred to herein as a virtual material. Table 5 further depicts a virtual metal (V-metal) row that displays the sums of all metals by substance (i.e., 0.35 Cu in Al 380+1.62 Cu in Cu 390=1.655 Cu in the V-metal). Sums for a virtual plastic (V-Plastic) and a virtual epoxy (V-Epoxy) are likewise depicted in Table 5. FIG. 5F depicts a table of similar information for supplier part 'T60 (Table 6).

A materials breakdown by category (e.g., into virtual materials) facilitates compliance with environmental regulations and recycling efforts. For example, existing recycling infrastructures typically require the treatment of certain materials in the tires of an automobile separate from the treatment of those materials in the radio of an automobile. Assigning the tires and the radio to separate categories enable the materials breakdown by these two categories.

Next, at block 512, a minimum value and a maximum value of the combined masses for each substance by material category are identified. For example, the minimum virtual metal value for Cu is the virtual metal for supplier part SPN1 (i.e., 1.655) and the maximum value for Cu is the virtual metal for supplier part SPN2 (i.e., 1.944). FIGS. 5G and 5H depict exemplary tables of the identified minimum and maximum values for the company parts 'X21 and 'T60, respectively.

At block 514, each identified minimum value and each identified maximum value is multiplied by the corresponding part quantities. For example, the minimum value of Cu for the virtual metal corresponding to company part 'X21 is multiplied by two (see Table 1 quantity column), i.e., 1.655*2=3.31. In addition, the minimum value of Cu for the virtual metal corresponding to company part 'T60 is multiplied by three (see Table 1 quantity column), i.e., 16.524*3=49.572. FIG. 5I depicts an exemplary table of multiplied values of identified minimums and maximums for company parts 'X21 and 'T60 (Table 9).

At block 516, the multiplied identified minimum values and the multiplied identified maximum values for each of the company parts are separately summed by material category to determining a material breakdown for the product. For example, the multiplied minimum virtual metal values for company parts 'X21 and 'T60 are combined, i.e., 3.31+49.572=52.882. FIG. 5I further depicts an exemplary table including the summed values of the multiplied identified minimum values and multiplied identified maximum values (Table 9).

The determined material breakdown is then processed at block 518 to determine additional information including at least one of the following (i) minimum (maximum) substance values by material category, (ii) average of minimum and maximum substance values by material category, (iii) average substance value total for the product, (iv) average substance value tolerance for the product, and (v) compositions by substance for material categories. The maximum substance value by material category enables a "worst case" analysis of the selected product, parts, and materials.

To find the minimum (maximum) values by material category, the minimum and maximum values for each substance associated with a particular material category are summed. The average of the minimum and maximum values for a material category may be presented as the mass of that material category. For example, the mass of the virtual metal (V-Metal) is found by combining the minimum determined V-Metal mass and the maximum determined V-Metal mass and dividing by two, i.e., (65.09+72.38)/2=68.73. FIG. 5J depicts an exemplary table setting forth these value for each material category (Table 10). Also included in Table 10 are average total and tolerance values for reporting purposes. The tolerance may be calculated by dividing the difference between the maximum value and the average by the average. In effect, the tolerance when added or subtracted from the average yields the calculated minimum and maximum values.

Composition calculations may be based on the maximum values and reported as a percentage composition of each of the substances within the material category. The maximum value from Table 9 for a substance within a material category may be divided by the sum of all the base materials in the material category. FIG. 5K depicts an exemplary table of compositions (Table 11). FIG. 5L depicts an exemplary table providing proof of accuracy for composition calculations in accordance with the present invention (Table 12). Calculation for determining the values presented in Tables 11 and 12 will be understood by those of skill in the art from the description herein.

Determining the maximum amount of a substance within each material category allows for a representation of the material categories that is statistically correct where the variance introduced by the analysis is clearly stated. Materials are typically classified according to their recycling compatibility, i.e., aluminum alloys are grouped together as they can be recycled in the same recycling stream, while elastomers are separated from thermoplastics due to the need to have them recycled in separate recycling streams. The maximum amount and location of banned substances present in a product is important to know as many of the banned substances can contaminate the product's recycling stream and negate its monetary value in addition to being harmful to the environment or the health and safety of its users. In this case it would be critical to remove the parts containing these substances from the product prior to it entering the recycling process.

At block 520, material breakdown information for the product and/or other related information is presented, e.g., via presentation device 306 or interface device 308. The information may be presented on a monitor or printed for presentation on paper. Additionally, the information may be presented through reports to company personnel and government agencies, e.g., via electronic communications. In an exemplary embodiment, the part compositions may be aggregated (either fully or partially) for presentation.

Figure 6:
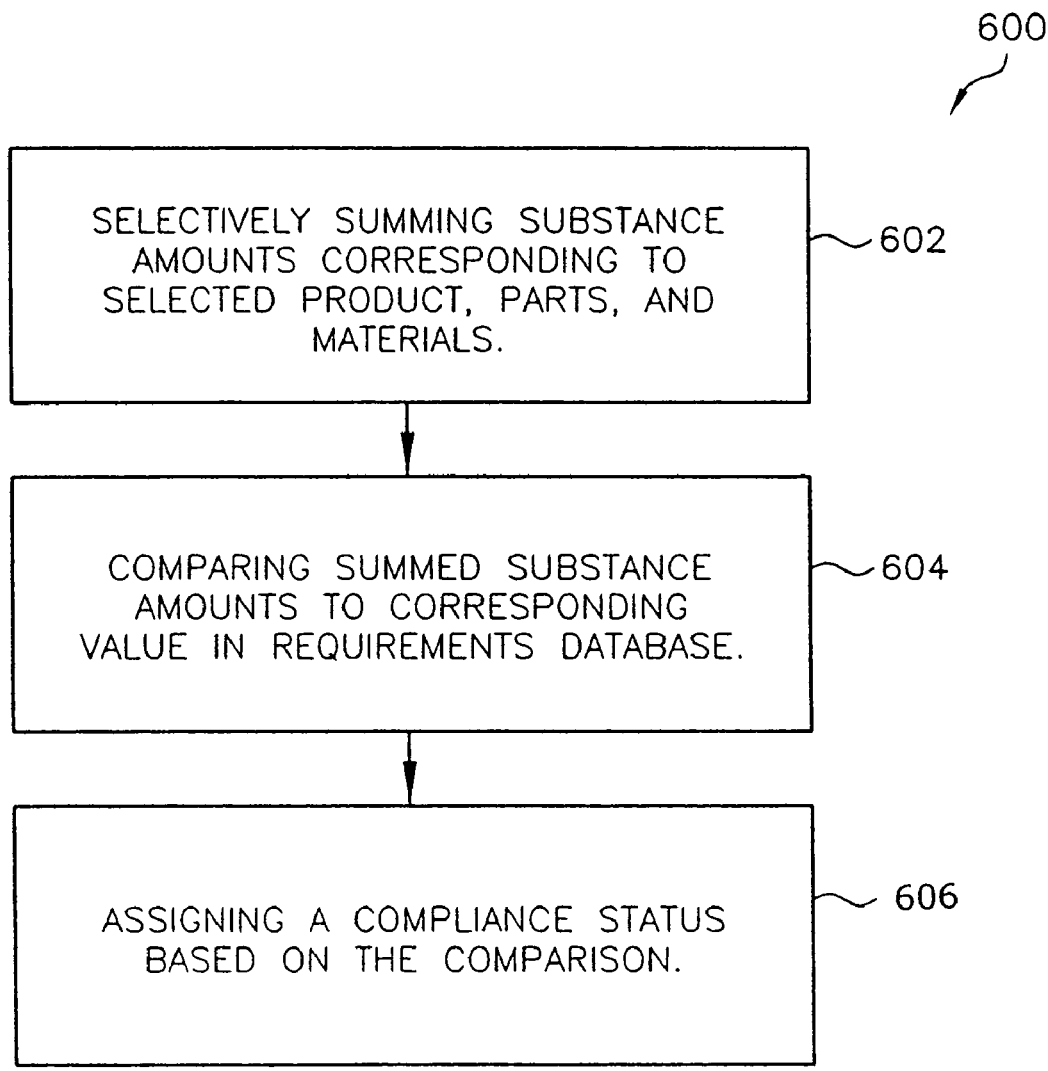
FIG. 6 is a flow chart of exemplary steps for processing relationship information and substance amounts to determine product compliance in accordance with an aspect of the present invention.

FIG. 6 depicts a flow chart 600 of exemplary steps for determining compliance with a requirement such as a rule or a regulation. Initially, at block 602, substance amounts corresponding to selected product, parts, and materials are selectively summed. Relationships associated with the selected product, parts, and materials, which includes the substance amounts, may be obtained as described above with reference to blocks 502-514 of FIG. 5. The substance amounts may be summed such that the total amount of a particular substance is found in a selected product, part, and/or material.

At block 604, the summed substance amounts are compared to corresponding values in a requirements database. The requirements database may specify the maximum values (e.g., by weight or concentration) of one or more substances within a product, part, and/or material. For example, the requirements database may include an entry specifying that the maximum amount of lead (Pb) in a part is ten (10) grams. The summed substance amount is then compared to this specified maximum amount.

Finally, at block 606, a compliance status is determined for the product, part, and/or material based at least in part on the comparison in the step of block 604. Compliance with existing regulations or requirements (such as, by way of non-limiting example, federal regulations, corporate policies, customer requirements etc.) may be determined by determining the compliance of each supplier part by analyzing the concentration of each substance at the homogeneous material level and documenting the results based on the type of material where the substance is present or the application/product where the part is being used. The compliance of a company part may be determined by analyzing the compliance status of supplier parts that are associated with that company part. Compliance of supplier and company parts are described in further detail below.

Exemptions may be granted, e.g., by regulators, due to the inability to use another substance, for example. If the substance exceeds the threshold maximum level but an exemption exists, the assigned compliance may be identified as a pass with an exemption. Thus, the assignment of the compliance status may be further based on existing exemptions. In an exemplary embodiment, exemptions are recorded and the substance amount may be used for a "worst case" analysis and an overall compliance result for the product. If the substance exceeds the threshold maximum level and an exemption does not exist, a part may be designated as fail and may be optionally excluded from such calculations.

A compliance status flag indicating the compliance of a product, part, and/or part composition with one or more environmental standards may be generated for display on a presentation device 306 (FIG. 3) in accordance with the assigned compliance status. For example, the breakdown of substances for a product and/or one or more of the parts or materials may be compared to one or more environmental standards. The product and/or one or more parts or part compositions may then receive an indicator indicating compliance with the one or more standards. For example, a part may receive a "PASS" indicator if the part does not contain any prohibited substances according to an environmental standards or a "FAIL" indicator if the part does contain a prohibited substance and does not comply with one or more environmental standards. In addition, the part may receive an interim "CONDITIONAL FAIL" indicator if the part would pass if an exemption was present (obtained) until reviewed by the user or a "PASS WITH EXEMPTIONS" indicator if the part would fail in the absence of an exemption and an exemption has been defined by the user. If a part is supplied by more than one supplier in the supply chain, at least one of the parts has received a "PASS" indicator, and the remaining supplier parts have no status or a status of "FAIL" the company part may receive an indicator of "PARTIAL FAIL". The compliance status of a product may be determined by analyzing the compliance indicators for all parts and part compositions in the product and the exemptions for each (if applicable).

Tables 1 and 2 set forth multiple compliance indicators for a supplier part and a company part, respectively.

TABLE 1

| Compliance Status | Criteria |
|---|---|
| PASS | If none of the substances found in the material content of the supplier part are controlled substances per the compliance specification; or |
| PASS WITH EXEMPTION | If a part contains a controlled substance that has been assigned a valid exemption per the compliance specification and contains no controlled substances without a threshold tolerance per the compliance specification. |
| FAIL | If a part contains a controlled substance that does not have a threshold tolerance and does not have a valid exemption per the compliance specification. |
| CONDITIONAL FAIL | If a part contains a controlled substance with a threshold tolerance that has not been resolved by completion of the compliance questionnaire and does not contain a controlled substance without a threshold tolerance per the compliance specification. |

TABLE 2

| Compliance Status | Criteria |
|---|---|
| PASS | All Supplier Parts related to the Company Part with a qualification status of "QUALIFIED" have a Compliance Status of PASS. |
| FAIL | All of the Supplier Parts related to the Company Part with a qualification status have a Compliance Status of FAIL, CONDITIONAL FAIL or No Value. |
| PARTIAL FAIL | One or more qualified Supplier Part have a Compliance Status of FAIL, CONDITIONAL FAIL, or No Value and at least one qualified Supplier Parts has a Compliance Status of PASS or PASS with Exemption. |
| PASS WITH EXEMPTION | One or more qualified Supplier Parts have a Compliance Status of PASS WITH EXEMPTION and none have a Compliance Status of CONDITIONAL FAIL, FAIL, or No Value. |
| NO DATA | None of the qualified supplier Parts have an assigned Compliance Status. |

By identifying parts or part compositions with a status indicator such as pass or fail, the present invention may be used to identify suppliers of specific parts that are causing non-compliance with the environment criteria or related standards. The manufacturer of the product may then stop using parts from this supplier or require that the supplier take corrective action.

The present invention is especially useful for determining compliance with regulation when parts are multi-sourced (sourcing of a single part performing the same form, fit and function to multiple vendors), the random utilization of one part or the other based on availability and cost, dissimilar material construction among parts even when they share the same form, fit and function, and the potential use of these parts in different product types (i.e. consumer products, infrastructure, automotive, etc . . . ).

The present invention may further include a feature to convert materials from one unit of measurement to another. For example, glue is often purchased by a volume unit such as liter. From a manufacturing perspective, glue can be consumed in volume (e.g., milliliters), mass (e.g., grams) or simply put out on the floor and used until the bottle is empty. The supplier may report the material content in grams/liter. If the glue is consumed in a volume unit, then the present invention has the capability to multiply the (consumed volume) by (volume conversion to liters) and by (grams/liter data reported by supplier) to calculate valid data (grams). If the mass units conflict, e.g., the material is consumed in a length unit (e.g., inches) and reported in grams/liters, the user may be prompted to override the consumed unit and manually enter a new quantity. Alternatively, the user may enter a valid estimation for processing. The application and use for a unit conversion feature depends upon the particular product, part, part composition, and base materials.

In an exemplary embodiment, software in accordance with the present invention is deployed to each supplier of parts in a supply chain for a product. The software may then gather base material information for technical materials for each part. The gathered information can then be "rolled-up" the supply chain electronically to generate the materials breakdown for a product. Technical materials of parts may be maintained separately or aggregated (either fully or partially) as they are rolled-up.

Some exemplary screen shots of a product in accordance with the present invention are now described.

Figure 7:
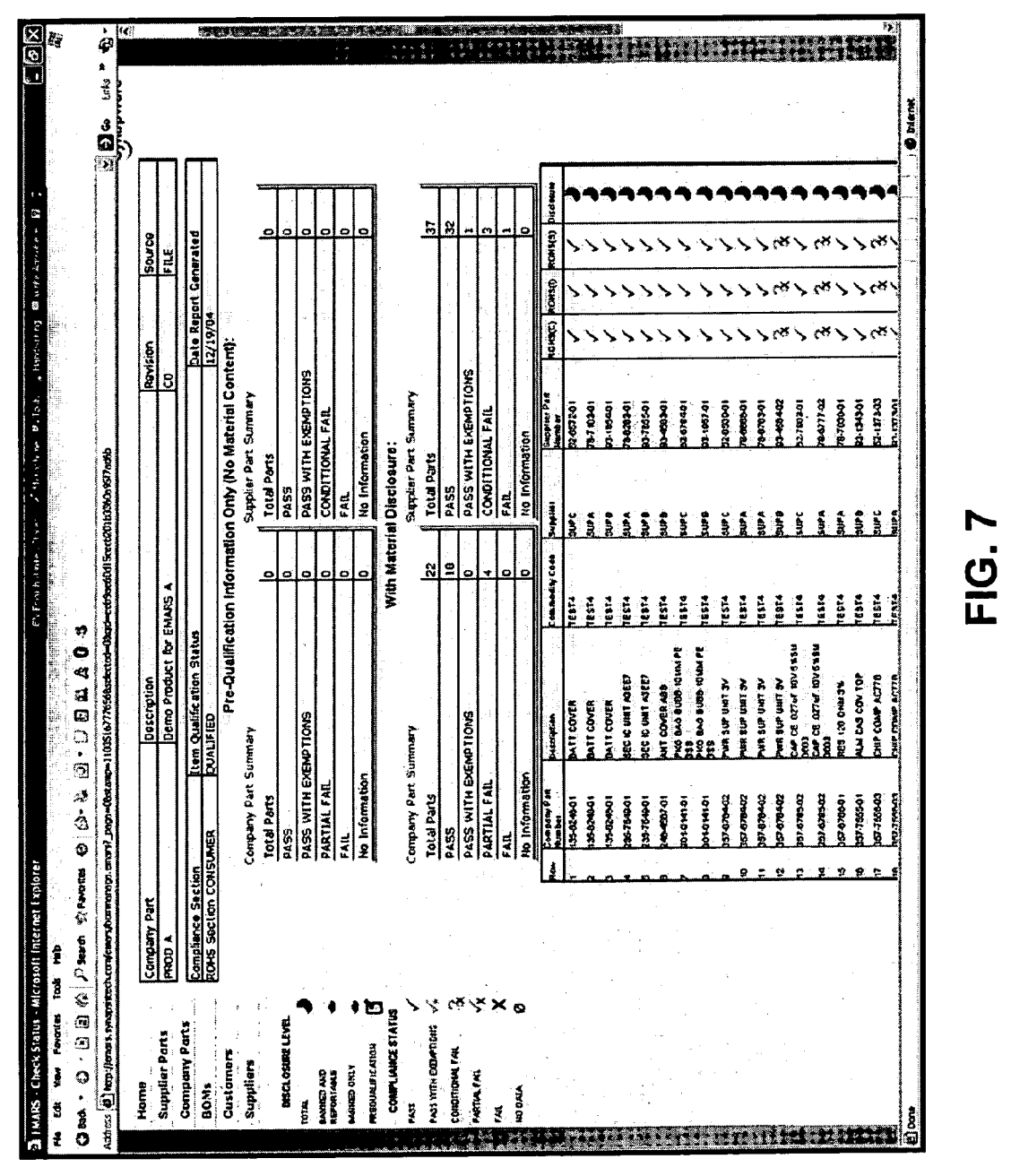

FIG. 7 is a screen shot of an exemplary screen for presenting a bill of materials (BOM) status report. The information in the report provides a summary of the compliance status of all supplier parts in the product and the compliance status of each supplier part.

Figure 8:
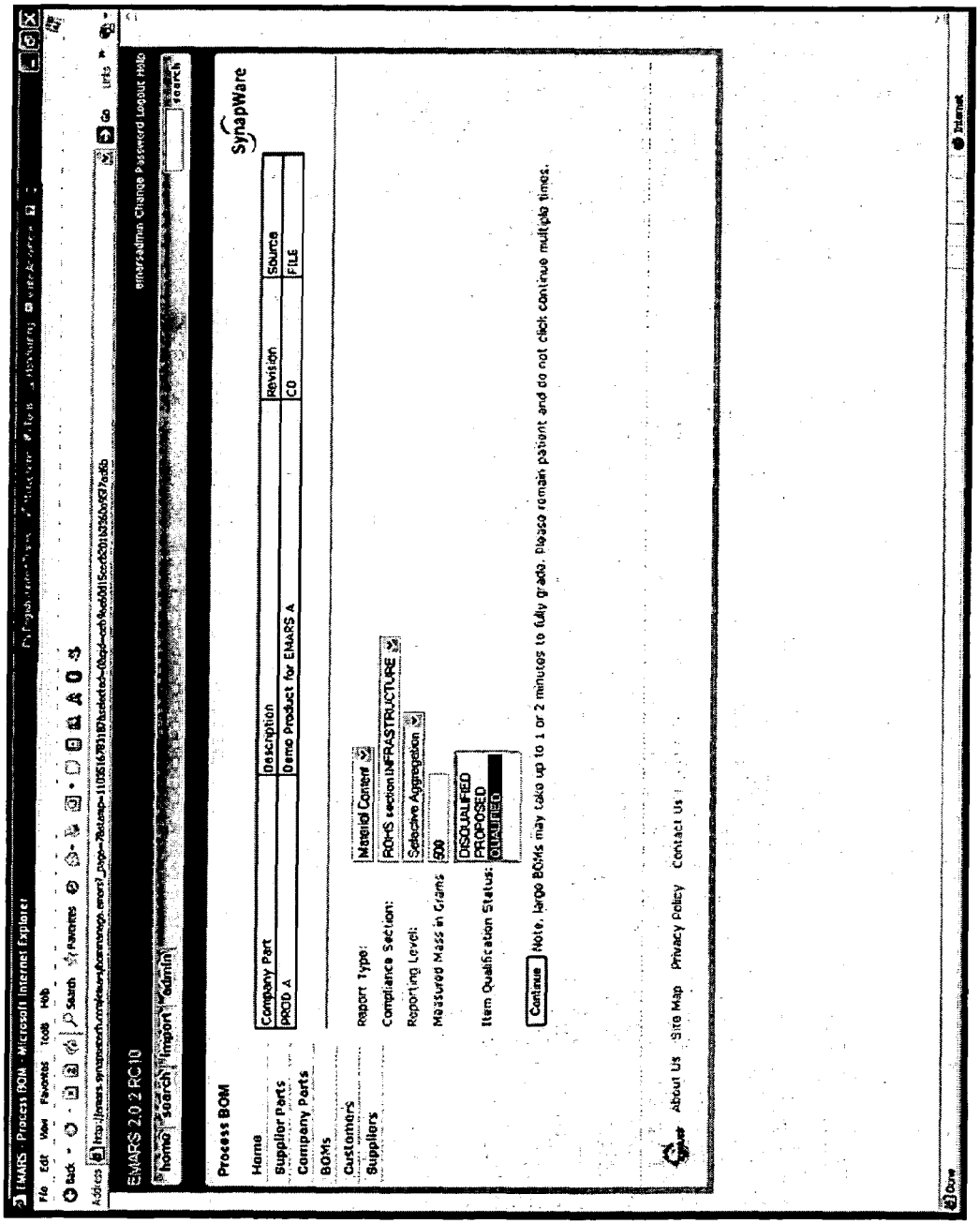
FIG. 8 is a screen shot of an exemplary screen for presenting user options to generate an aggregate product material content report in accordance with an aspect of the present invention.

FIG. 8 is a screen shot of an exemplary screen for presenting user options to generate an aggregate product material content report. The product can be graded against one or more predefined environmental standard, aggregated at various levels, and generated based on qualification of individual parts.

Figure 9:
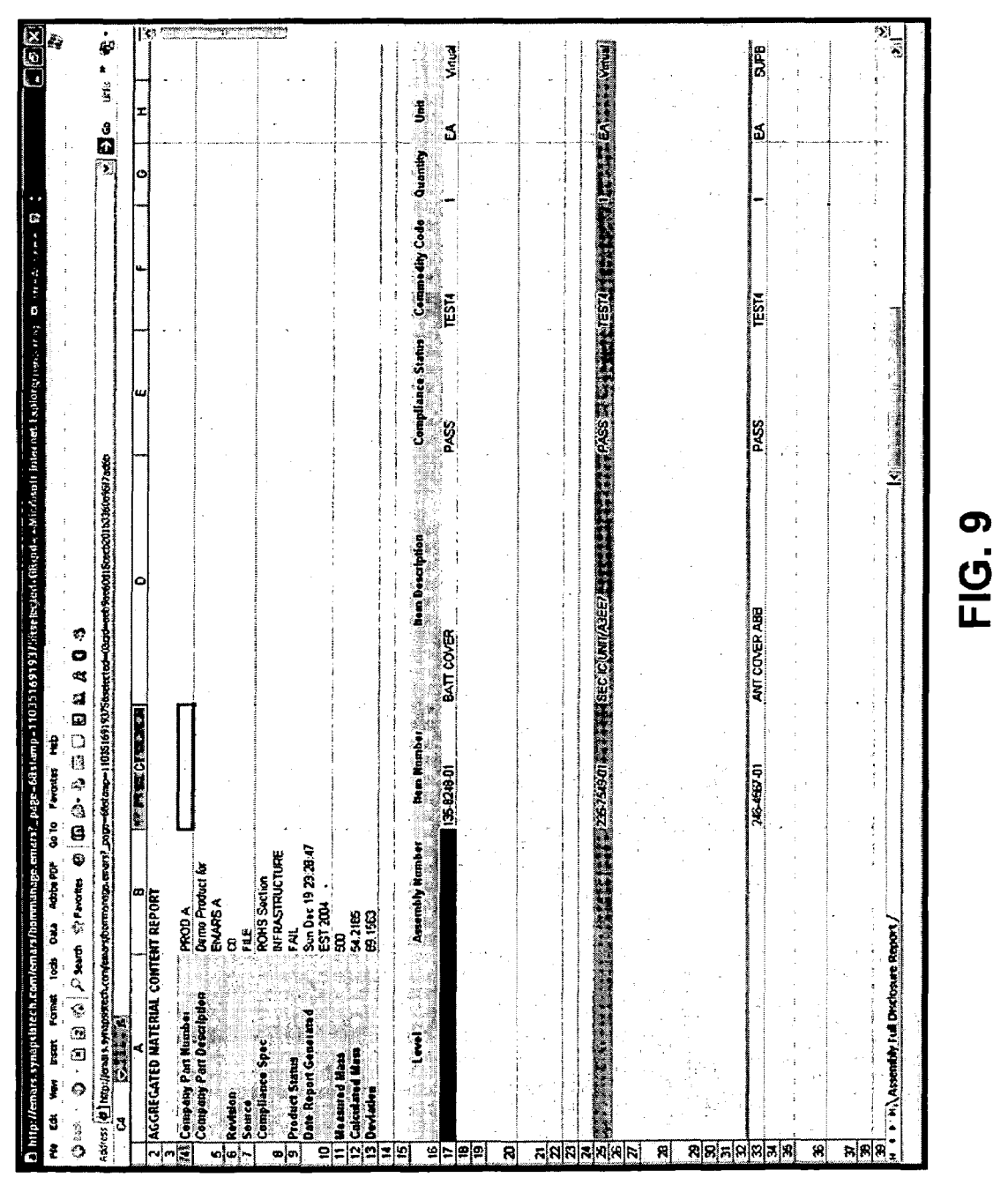

FIG. 9 is a screen shot of an exemplary screen presenting an exemplary worst case analysis report for a product exported to an Excel spreadsheet produced by Microsoft Corp. of Redmond, Wash., USA.

Figure 10:
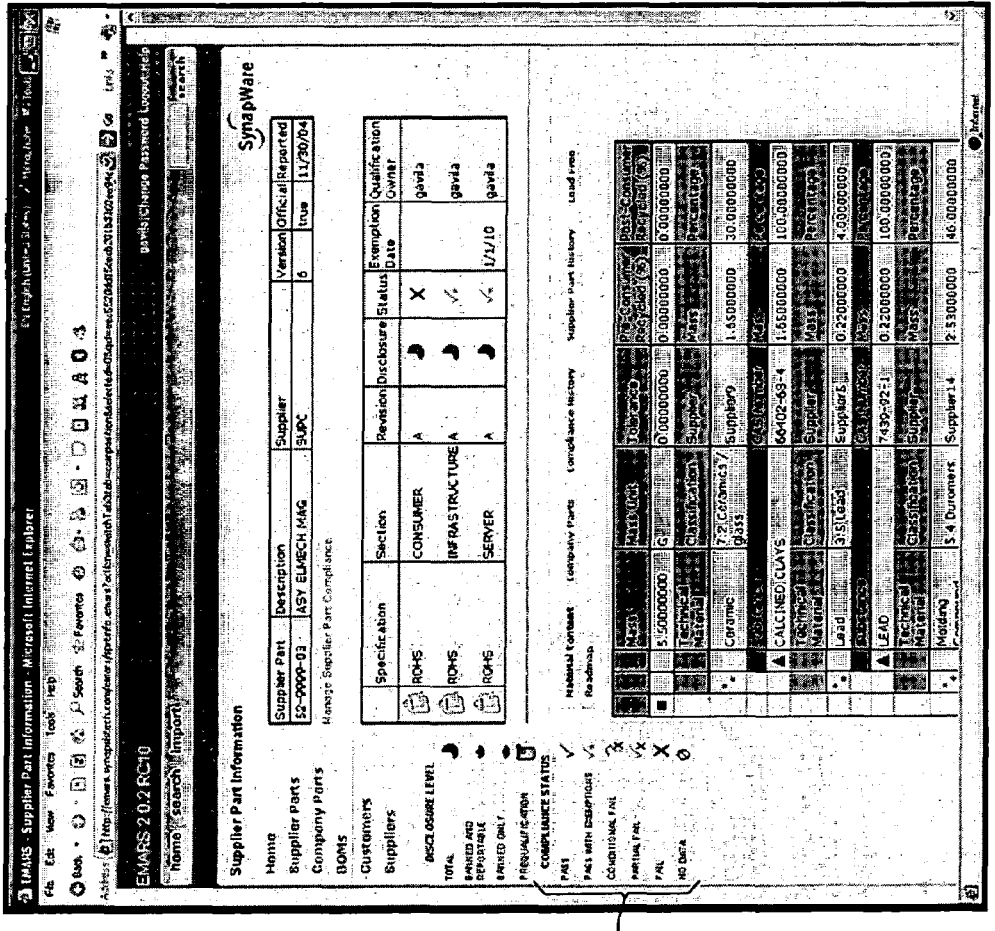
FIG. 10 is a screen shot of an exemplary screen for presenting a part graded against environmental standards in accordance with an aspect of the present invention.

FIG. 10 is a screen shot of an exemplary screen for presenting a part graded against three environmental standards (RoHS Consumer, RoHS Infrastructure, and RoHS Server) and has a potential status of FAIL, PASS, and PASS w/Exemption. In the illustrated screen shot, compliance status is depicted with a compliance status icon. Potential compliance status icons are depicted in a compliance status legend 902.

Figure 11:
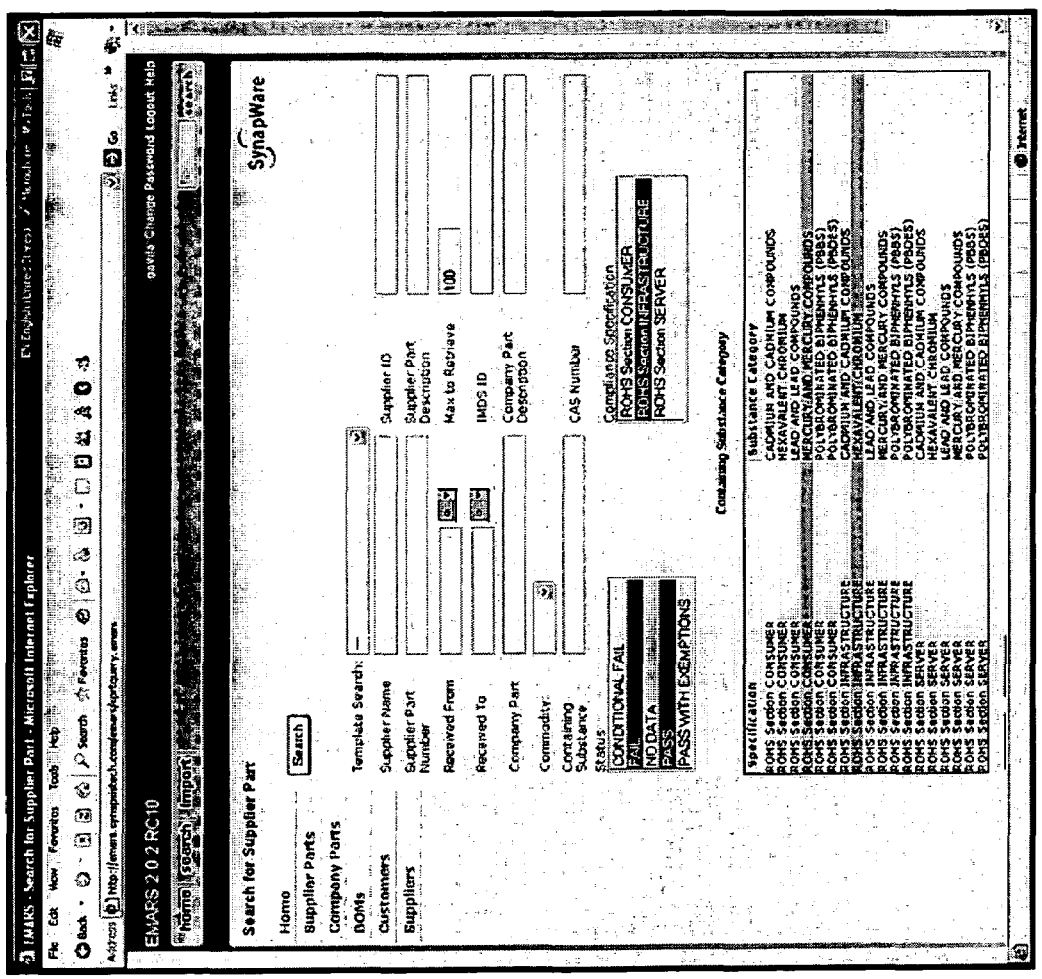
FIG. 11 is a screen shot of an exemplary screen for displaying entry of a search to identify all parts with a compliance status of FAIL or PASS for an environmental standard in accordance with an aspect of the present invention.

FIG. 11 is a screen shot of an exemplary screen for displaying entry of a search to identify all parts with a compliance status of FAIL and PASS for a particular environmental standard (i.e., ROHS Infrastructure).

Figure 12:
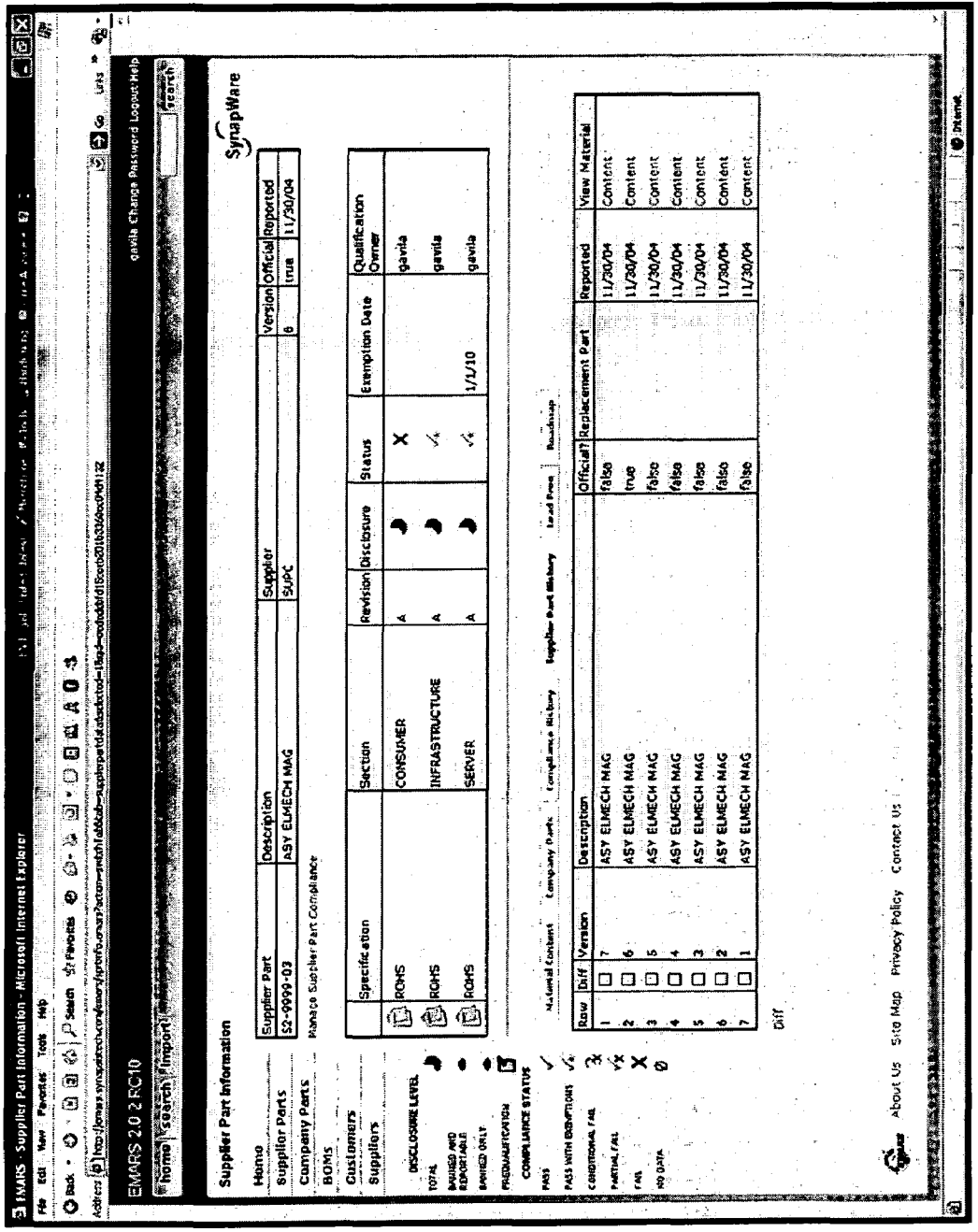
FIG. 12 is a screen shot of an exemplary screen for displaying an audit trail for each report submitted by a supplier for a specific supplier part in accordance with an aspect of the present invention.

FIG. 12 is a screen shot of an exemplary screen for displaying an audit trail for each report submitted by a supplier for a specific supplier part.

Figure 13:
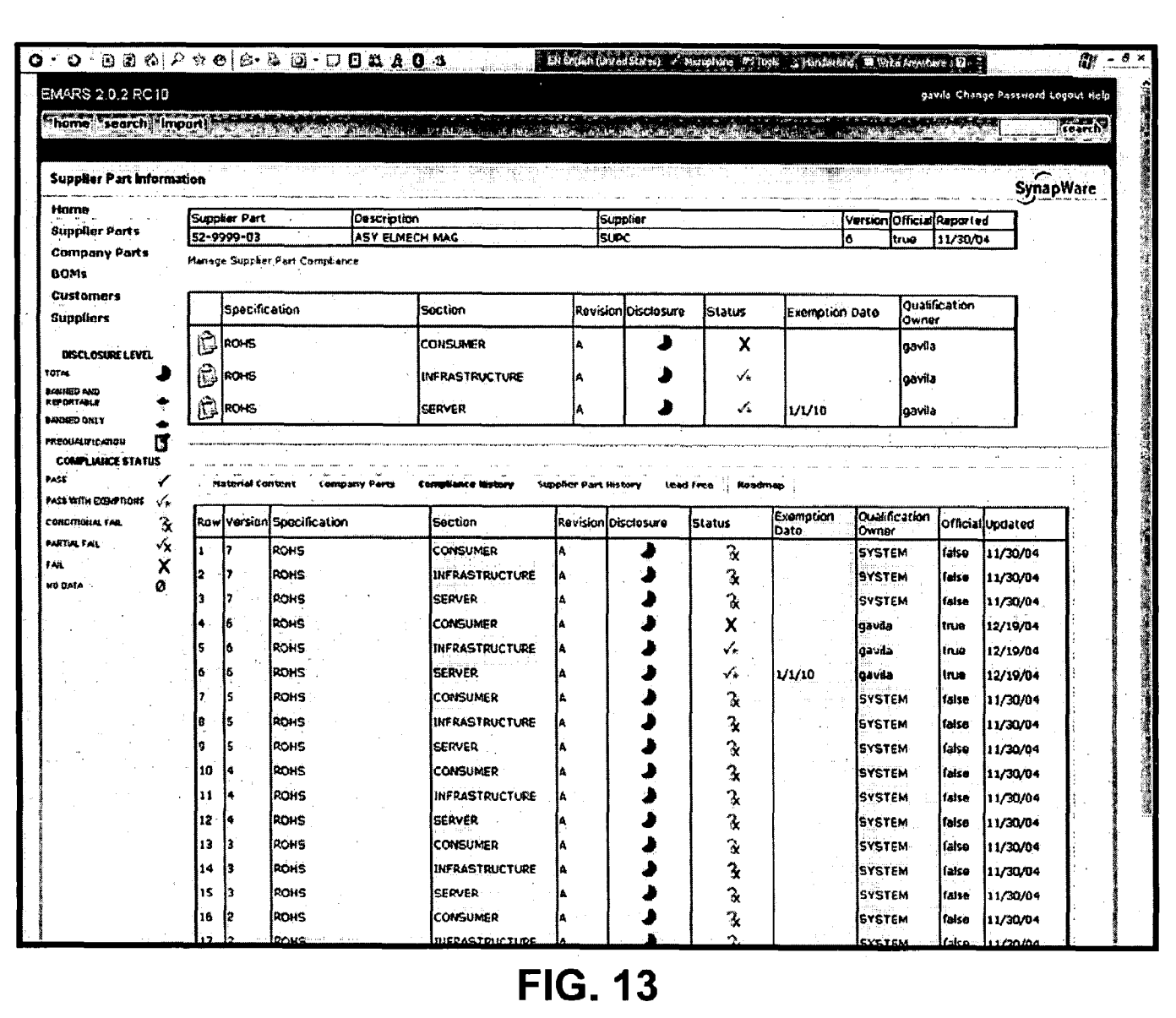

FIG. 13 is a screen shot of an exemplary screen for displaying an audit trail for the compliance history of each requested supplier part report.

One or more of the functions described above may be implemented in software that controls a processor 302 (FIG. 3) of a computer. This software may be embodied in a computer readable carrier, for example, a magnetic or optical disk, a memory-card or an audio frequency, radio-frequency, or optical carrier wave.

Although the invention is illustrated and described herein with reference to specific embodiments, the invention is not intended to be limited to the details shown. Rather, various modifications may be made in the details within the scope and range of equivalents of the claims and without departing from the invention. For example, although the present invention is primarily described above with reference to electronic parts, the present invention is equally applicable to any products that can be broken down into materials containing substances such as mattresses and furniture, for example.

What is claimed is:

1. A method for analyzing a product including parts, wherein each part includes at least one material, each material includes at least one substance, and each substance has a respective substance amount, with at least one database including relationship information for the product, parts, materials, substances, and substance amounts, the method comprising the steps of:

receiving an instruction to select a product, the product including at least one part having two or more vendors;

retrieving, from the database responsive to the received product selection instruction, relationship information including substance amounts of the parts for the selected product, wherein each part having two or more vendors has a substance amount associated with each vendor of that part; and processing the retrieved select relationship information to determine at least one of (1) a materials breakdown or (2) a compliance status for the selected product for presentation to a user, wherein said processing step comprises selecting, for each part having two or more vendors, a maximum substance amount from the substance amounts associated with the two or more vendors for those parts for use in the determination.

2. The method of claim 1, wherein the processing step comprises the step of:

for like substances, selectively summing substance amounts for the selected product, parts, and materials.

3. The method of claim 2, wherein each material has a corresponding material category and wherein the selective summing step is based at least in part on the material categories corresponding to the materials including the summed substances.

4. The method of claim 2, wherein rules associated with at least one of the product, parts, materials are stored in a requirements database and wherein the processing step further comprises the steps of:

comparing the summed substance amounts to corresponding values in the requirements database; and assigning a compliance status based on the comparison.

5. The method of claim 4, wherein the rules further define exemptions and wherein the assigning step comprises the steps of:

identifying exemptions associated with the selected parts and materials; and assigning the compliance status based further on the identified exemptions.

6. The method of claim 1, wherein each part has a corresponding quantity, the corresponding quantity of at least one part is greater than one, and the processing step comprises the step of:

multiplying the substance amounts for at least one part by the associated quantity.

7. The method of claim 1, wherein the processing step comprises the steps of:

selecting a minimum substance amount and a maximum substance amount for each part having two or more vendors, wherein the minimum substance amount and the maximum substance amount for each part correspond to different vendors; and for like substances, summing substance amounts for parts with one vendor with each of the minimum substance amount and the maximum substance amount for each part with two or more vendors.

8. The method of claim 7, wherein each material has a corresponding material category and wherein the method further comprises the steps of:
   identifying material categories for each material;
   wherein the substance amounts of substances within materials with common identified material categories are summed.

9. The method of claim 7, further comprising the step of:
   performing a worst case analysis for the selected product, parts, and materials.

10. The method of claim 1, wherein the corresponding amounts each have an associated mass, each part is associated with a part quantity, each material is associated with a material category, and the processing step comprises the steps of:
    calculating a mass for each substance of each material for each selected part;
    combining the masses for each material for each part for materials having the same material category;
    identifying a minimum value and a maximum value of the combined masses for each material by material category;
    multiplying each identified minimum value and each identified maximum value by the associated part quantities;
    summing the multiplied identified minimum values and summing the multiplied identified maximum values by material category to determine a material breakdown for the product.

11. The method of claim 10, further comprising the steps of:
    processing the determined material breakdown to derive at least one of the following (i) minimum substance values by material category, (ii) maximum substance values by material category, (iii) average minimum and maximum substance values by material category, (iv) average substance value total for product, (v) average substance value tolerance for product, and (vi) compositions by substances for material categories.

12. The method of claim 1, wherein the step of receiving instructions comprises the step of:
    receiving instructions to select from the at least one part for analysis.

13. A system for analyzing a product including parts supplied by at least one vendor, wherein each part includes at least one material, each material includes at least one substance, and each substance has a respective substance amount, with at least one database including relationship information for the product, parts, materials, substances, and substance amounts, the system comprising:
    means for receiving instructions to select a product, the product including at least one part having two or more vendors;
    means for retrieving, from the database responsive to the received product selection instruction, relationship information including substance amounts of the parts for the selected product, wherein each part having two or more vendors has a substance amount associated with each vendor of that part; and
    a processor that processes the retrieved relationship information to determine at least one of (1) a materials breakdown or (2) a compliance status for the selected product for presentation to a user, wherein the processor is configured to select for each part having two or more vendors, a maximum substance amount from the substance amounts associated with the two or more vendors for those parts for use in the determination.

14. The system of claim 13, wherein the corresponding amounts each have an associated mass, each part is associated with a part quantity, each material is associated with a material category, and the processor comprises:
    means for calculating a mass for each substance of each material for each selected part;
    means for combining the masses for each material for each part for materials having the same material category;
    means for identifying a minimum value and a maximum value of the combined masses for each material by material category;
    means for multiplying each identified minimum value and each identified maximum value by the associated part quantities;
    means for summing the multiplied identified minimum values and summing the multiplied identified maximum values by material category to determine a material breakdown for the product.

15. The system of claim 14, further comprising:
    means for processing the determined material breakdown to derive at least one of the following (i) minimum substance values by material category, (ii) maximum substance values by material category, (iii) average minimum and maximum substance values by material category, (iv) average substance value total for product, (v) average substance value tolerance for product, and (vi) compositions by substances for material categories.

16. The system of claim 13, wherein the processor comprises:
    means for selecting a minimum substance amount and a maximum substance amount for each part having two or more vendors, wherein the minimum substance amount and the maximum substance amount for each part correspond to different vendors; and
    for like substances, means for summing substance amounts for parts with one vendor with each of the minimum substance amount and the maximum substance amount for each part with two or more vendors.

17. A computer readable carrier including software that is configured to control a computer to implement a method embodied in a computer readable medium for analyzing a product, the product including at least one part with each of the parts supplied by at least one vendor, wherein each of the parts includes at least one material, each of the materials includes at least one substance, and each of the substances have a respective substance amount, with at least one database including relationship information for the product, parts, materials, substances, and substance amounts, the method comprising the steps of:
    receiving instructions to select a product, the product including at least one part having two or more vendors;
    retrieving, from the database responsive to the received product selection instruction, relationship information including substance amounts of the parts for the selected product, wherein each part having two or more vendors has a substance amount associated with each vendor for that part; and
    processing the retrieved relationship information to determine at least one of (1) a materials breakdown or (2) a compliance status for the selected product, for presentation to a user, wherein said processing step comprises selecting, for each part having two or more vendors, a maximum substance amount from the substance amounts associated with the two or more vendors for those parts for use in the determination.

18. The computer readable carrier of claim 17, wherein the processing step for implementation by the computer comprises the step of:
  for like substances, selectively summing substance amounts for the selected product, parts, and materials.

19. The computer readable carrier of claim 18, wherein rules associated with at least one of the product, parts, materials are stored in a requirements database and wherein the processing step for implementation by the computer further comprises the steps of:
  comparing the summed substance amounts to corresponding values in the requirements database; and
  assigning a compliance status based on the comparison.

20. The computer readable carrier of claim 19, wherein the rules further define exemptions and wherein the assigning step for implementation by the computer comprises the steps of:
  identifying exemptions associated with the selected parts and materials; and
  assigning the compliance status based further on the identified exemptions.

21. The computer readable carrier of claim 17, wherein each part has a corresponding quantity, the corresponding quantity of at least one part is greater than one, and the processing step for implementation by the computer comprises the step of:
  multiplying the substance amounts for at least one part by the associated quantity.

22. The computer readable carrier of claim 17, wherein the processing step for implementation by the computer comprises the steps of:
  selecting a minimum substance amount and a maximum substance amount for each part having two or more vendors, wherein the minimum substance amount and the maximum substance amount for each part correspond to different vendors; and
  for like substances, summing substance amounts for parts with one vendor with each of the minimum substance amount and the maximum substance amount for each part with two or more vendors.

23. The computer readable carrier of claim 22, wherein each material has a corresponding material category and wherein the method implemented by the computer further comprises the steps of:
  identifying material categories for each material;
  wherein the substance amounts of substances within materials with common identified material categories are summed.

24. The computer readable carrier of claim 22, wherein the method implemented by the computer further comprising the step of:
  performing a worst case analysis for the selected product, parts, and materials.

25. The computer readable carrier of claim 17, wherein the corresponding amounts each have an associated mass, each part is associated with a part quantity, each material is associated with a material category, and the processing step for implementation by the computer comprises the steps of:
  calculating a mass for each substance of each material for each selected part;
  combining the masses for each material for each part for materials having the same material category;
  identifying a minimum value and a maximum value of the combined masses for each material by material category;
  multiplying each identified minimum value and each identified maximum value by the associated part quantities;
  summing the multiplied identified minimum values and summing the multiplied identified maximum values by material category to determine a material breakdown for the product.

26. The computer readable carrier of claim 25, wherein the method implemented by the computer further comprising the steps of:
  processing the determined material breakdown to derive at least one of the following (i) minimum substance values by material category, (ii) maximum substance values by material category, (iii) average minimum and maximum substance values by material category, (iv) average substance value total for product, (v) average substance value tolerance for product, and (vi) compositions by substances for material categories.

* * * * *